United States Patent
Böhm et al.

(10) Patent No.: US 6,492,017 B1
(45) Date of Patent: Dec. 10, 2002

(54) SELF-ADHESIVE HIGHLY TRANSPARENT PROTECTIVE ARTICLE FOR AUTOMOBILE WINDOWS AND OTHER SENSITIVE SURFACES

(75) Inventors: Nicolai Böhm, Hamburg (DE); Jobst-Waldemar Klemp, Schenefeld (DE); Horst-Günther Ströh, Hamburg (DE)

(73) Assignee: tesa AG, Hamburg (DE)

( * ) Notice: Subject to any disclaimer, the term of this patent is extended or adjusted under 35 U.S.C. 154(b) by 169 days.

(21) Appl. No.: 09/709,862

(22) Filed: Nov. 10, 2000

(30) Foreign Application Priority Data

Nov. 13, 1999 (DE) ......................................... 199 54 701

(51) Int. Cl.$^7$ ............................................... B32B 27/32
(52) U.S. Cl. ................ 428/337; 428/340; 428/355 EN; 428/355 RA; 428/516; 428/520; 150/168; 156/327
(58) Field of Search .................... 428/355 EN, 355 RA, 428/516, 520, 337, 340; 156/327; 150/168

(56) References Cited

U.S. PATENT DOCUMENTS

| | | | |
|---|---|---|---|
| 5,227,233 A | * 7/1993 | Itaba et al. ............... | 427/208.6 |
| 5,851,639 A | * 12/1998 | Reinders ..................... | 427/212 |
| 5,925,456 A | 7/1999 | Malek ........................ | 428/332 |
| 6,117,945 A | * 9/2000 | Mehaffy et al. ............ | 524/487 |

FOREIGN PATENT DOCUMENTS

| | | |
|---|---|---|
| EP | 0 826 754 | 3/1998 |
| GB | 940 713 | 10/1963 |
| JP | 05-077591 | * 3/1993 |

* cited by examiner

Primary Examiner—D. Lawrence Tarazano
(74) Attorney, Agent, or Firm—Morris, McLaughlin & Marcus

(57) ABSTRACT

A surface protection film comprising a transparent backing of polypropylene or propylene-ethylene copolymer, which comprises a light stabilizer, and a self-adhesive composition of polyethylene-vinyl acetate (EVA) having a VA fraction of from 40 to 80% by weight and a melt index MFI in accordance with ISO 1133 (A/4) of from 0.5 to 25 g/10 min at 190° C. and 2.16 kg, which is blended with from 0 to 35% by weight of a polyether of the form $$XO-[(CH_2)_4-O]-Y \qquad (1)$$

or $$XO-[CH(CH_3)-CH_2-O]-Y \qquad (2)$$

having a weight-average molecular weight $M_w$ of from 200 to 100,000 g/mol, X and Y being selected from the group consisting of H—, $(C_nH_{2n+1})$— where n is from 1 to 20, $CH_2=CHCO—$, $CH_3CH(NH_2)CH_2—$, 2,3-epoxypropyl- or $C_6H_5—CO—$, $CH_2=C(CH_3)—CO—$.

6 Claims, No Drawings

SELF-ADHESIVE HIGHLY TRANSPARENT PROTECTIVE ARTICLE FOR AUTOMOBILE WINDOWS AND OTHER SENSITIVE SURFACES

The invention relates to a protective film whose high transparency and reliable adhesion make it particularly suitable for the temporary protection of automobile glass and also other sensitive surfaces such as metals, plastics and surface coatings.

On the long journey traveled by export vehicles in particular from the manufacturing plant to the end user, starting with the assembly of the vehicle and continuing by way of its loading onto railcars, transportation by rail or road, unloading from the railcar, loading onto ships, the ship journey, unloading from the ship, transportation to the central storage facility, and transportation through to the local dealer, the new vehicle is exposed to diverse harmful influences. Repairs to paint and windows, especially the windshield, are the order of the day, since the customer demands a flawless new vehicle. This is a considerable cost factor for the manufacturers, and there is a great interest in reducing this expense.

Whereas minor paint damage can generally be removed by means of a small refinish, making good a scratch on an automobile window necessitates its complete replacement.

The replacement of a windshield is particularly expensive. In the case of a windshield installed by bonding with a water-reactive PU adhesive, the technique now used almost universally, the windshield is removed using a wire which cuts through the adhesive film. In the course of this operation, the windshield frame paint is often damaged, necessitating additional repairs. For the manufacturer, accordingly, there arise costs for the replacement windshield, for its removal and installation, and, possibly, for the repair of the paint damage caused during its replacement. In some cases, additionally, the delivery times are prolonged significantly, and customers are unhappy.

For a number of years already, paint surfaces of new vehicles, especially exposed surfaces, such as trunk lids, roof and engine hood, in particular, have been effectively masked off using self-adhesive films. They protect the finishes against slight injuries and soiling by media such as battery acid or fuel, fly rust and bird excrement. These films generally comprise unoriented polyolefin films of polyethylene, polypropylene or propylene-ethylene copolymers, and also mixtures of these, filled with $TiO_2$ to improve the long-term stability. The adhesive composition used frequently comprises polyisobutylene or polyethylene-vinyl acetate.

The former are disclosed in EP 0 519 278 A2, where the adhesive composition is applied to a film which in turn is used to protect automobiles. The pressure-sensitive adhesive is based on polyisobutylene rubber, having a dynamic modulus of elasticity of from $2 \times 10^5$ to $7 \times 10^6$ dyn/cm$^2$, corresponding in SI units to a figure of from $2 \times 10^4$ to $70 \times 10^4$ Pa, at 60° C. In addition, the adhesive may have been blended with a silicone oil or with a low molecular mass acrylic polymer.

DE 196 35 704 A1 describes a self-adhesive surface protection film made from polyolefins with an adhesive comprising polyethylene-vinyl acetate (EVA) with a vinyl acetate content of from 40 to 80 mol %, especially 70 mol %, and with a loss angle tan δ of from 0.6 to 1.0, measured at a temperature of 60° C. and a frequency of $10^{-2}$ Hz, and from 0.4 to 0.7, measured at a temperature of 60° C. and a frequency of 10 Hz. EVA in the claimed form possesses good initial bond strength to paint and good paint compatibility. The high ultimate bond strength to paints and glass surfaces, although it permits highly reliable bonding, nevertheless necessitates a disproportionately great effort when removing the film, which may adversely affect the health of persons for whom the demasking is a daily task. Moreover, because of the high bond strength, tearing during the demasking operation is a frequent occurrence, and means that the film cannot be removed in one piece.

Those nontransparent, white films specified in the prior art, however, cannot be used for window protection, since the masked vehicles must be moved and arranged a number of times in the course of their distribution, and an unobstructed view through the windows is vital.

There have been numerous descriptions of window films, which alter the properties of the windows to which they are stuck—they do this, for example, by darkening shading, IR absorption for heat insulation, or as antireflection coatings. U.S. Pat. No. 5,925,453, for example, describes a window film which is light-reflecting and IR-absorbing and can be stuck to the inside of curved auto windows. Preferred candidates as backing materials, which may also be blended with the IR absorbent, include polyolefins such as polyethylene and polypropylene, polyvinyl chloride and polyesters such as polyethylene terephthalate and polybutylene terephthalate. Possible adhesive compositions cited are self-adhesive compositions, including synthetic rubbers such as styrene-butadiene rubber, polyisobutylene, styrene block copolymers and polyethylene-vinyl acetate, and also heat- and moisture-activable compositions. The film described, however, has no protective function, especially since it is applied from the inside to the concave glass surfaces. Articles of this kind are normally conceived for permanent bonding and must therefore meet different key requirements.

In the case of a protective film for automobile glass, particular value must be placed not only on outstanding transparency but also on easy, fold-free and rapid applicability and on a balanced bond strength—i.e., a bond strength which is not so weak that the film is detached under the influence of wind or slipstream, or even detaches by itself, but also not so strong that it is impossible to remove the film again without excessive effort or even tearing. Moreover, the film must withstand outdoor weathering periods, typical for its application, of approximately 6 months without becoming brittle, becoming dull, or leaving residues of adhesive composition on removal. The abovementioned requirements place stringent demands on film and adhesive composition and on the tailoring of the two components to one another.

Beiersdorf A G, Hamburg, Germany, has for many years sold as Article 4604 PV1 a transparent protective film which is used, inter alia, for window protection but which in many respects does not meet customer requirements of transparency, weathering stability and bonding reliability for this utility. The aforementioned article comprises a polyethylene backing and is coated with an acrylate self-adhesive composition. The film is slightly cloudy, which manifests itself as highly disruptive especially when light is incident from the sides. After a few weeks or outdoor weathering, the film becomes brittle under the effect of UV light, so that it can no longer be removed in one piece and the adhesive composition remains extensively on the glass. Furthermore, the film loses its adhesion properties at temperatures above 60° C., which are easily achieved under insolation, whereupon shrinkage-related folds are produced.

It is an object of the invention to provide a surface protection film for automobile glass, especially windshields, and other sensitive surfaces which does not exhibit the above-described disadvantages of the prior art, or not to the same extent. In particular, the surface protection film should possess not only a pronounced initial bond strength but also a balanced ultimate bond strength and an extremely high transparency, and also weathering stability.

This object is achieved by means of a surface protection film as laid down in the main claim. The subclaims relate to advantageous developments of the surface protection film.

The invention accordingly provides the construction of a surface protection film comprising a transparent backing of polypropylene or propylene-ethylene copolymer, which comprises a light stabilizer, and a self-adhesive composition of polyethylene-vinyl acetate (EVA) having a VA fraction of from 40 to 80% by weight and a melt index MFI in accordance with ISO 1133 (A/4) of from 0.5 to 25 g/10 min at 190° C. and 2.16 kg, which is blended with from 0 to 35% by weight of a polyether of the form

$$XO\text{—}[(CH_2)_4\text{—}O]\text{—}Y \qquad (1)$$

or

$$XO\text{—}[(CH(CH_3)\text{—}CH_2\text{—}O]\text{—}Y \qquad (2),$$

having a weight-average molecular weight $M_w$ of from 200 to 100,000 g/mol, X and Y being selected from the group consisting of H—, $(C_nH_{2n+1})$— where n is from 1 to 20, $CH_2$=CHCO—, $CH_3CH(NH_2)CH_2$—, 2,3-epoxypropyl-, $C_6H_5$—CO—, $CH_2$=C($CH_3$)—CO—.

In one preferred embodiment, the surface protection film comprises an unoriented film of from 30 to 120 μm in thickness, preferably from 35 to 80 μm in thickness, comprising a random propylene-ethylene copolymer having an ethylene fraction of from 2 to 10% by weight, preferably from 4 to 8% by weight, and more than 0.3% by weight, preferably more than 0.5% by weight, of a light stabilizer.

The adhesive composition comprises polyethylene-vinyl acetate having a VA fraction of from 40 to 80% by weight, preferably from 45 to 70% by weight, and an addition of (1) or (2) of from 0 to 35% by weight, preferably from 0 to 20% by weight, applied preferably at a rate of from 8 to 50 g/m², with particular preference from 10 to 30 g/m².

Between adhesive composition and film there may be a primer comprising EVA having a VA fraction of from 20 to 50% by weight, preferably from 25 to 40% by weight, in a thickness in particular of from 5 to 20 μm, preferably from 5 to 15 μm, which is coextruded with the backing layer. In this preferred form, the film is wound up in its final form directly after coating. The proposed primer possesses outstanding transparency, both alone and in conjunction with the film.

The use of the claimed propylene-ethylene copolymers combines a surface smoothness and transparency that is outstandingly suitable for this utility with great flexibility, so that bonding can take place without folds even to curved surfaces. The mechanical and optical properties of the film are significantly affected not only by the selection of raw materials but also by the production conditions. An advantageous process for the desired properties is the casting process, where the temperature of the chill rolls should be between 10 and 25° C. in order to permit extremely fine crystallization.

Under application conditions, the transparency is retained, even after using the windshield wipers and after 6 months in a Florida climate, to such a degree that the vehicle can still be removed without hazard.

Particularly suitable means of ensuring a long life of the film material, in a manner compatible with the application, are HALS light stabilizers such as, for example, dimethyl succinate polymer with 4-hydroxy-2,2,6,6-tetramethyl-1-piperidinoethanol (CAS No. 65447-77-0), bis(2,2,6,6-tetramethyl-4-piperidinyl)sebacate (CAS No. 52829-07-9) or poly[[6-[(1,1,3,3-tetramethylbutyl)amino]-1,3,5-triazine-2,4-diyl][[(2,2,6,6-tetramethyl-4-piperidyl)imino]hexamethylene[(2,2,6,6-tetramethyl-4-piperidyl)imino]] (CAS No. 70624-18-9).

The claimed adhesive composition based on EVA, with and without polyether addition, is highly suitable for glass surfaces, since it possesses the property of flowing out flush with glass and of producing a virtually invisible phase boundary between glass and composition. The EVA in the form described forms the polymer framework of the adhesive composition, with a moderately pronounced tack and a rapidly increasing bond strength thereon, which attains its ultimate value within a few days, this value being achieved more quickly under the action of heat.

Since the polymer framework in question is chemically uncrosslinked, and on the basis of its monomer proportion is only very slightly crystalline, the molecular weight, which correlates directly to the MFI, adopts a decisive position in respect of the cohesiveness of the adhesive composition. An MFI of from 1 to 5 has proven to be a favorable value. The addition of an EVA fraction having an MFI of up to 25, however, may contribute to improving the flow properties if the adhesive composition is to be applied from the melt or coextruded together with a backing.

The optional addition of the polyethers described has the effect of reducing bond strength at the same time as maintaining the required initial tack, the aging stability, the transparency, the health and environmental acceptability, and the freedom of the overstuck glass surfaces from deposits after demasking, if the ultimate bond strength of the adhesive film is perceived to be too high. The unwind behavior of the protective films, wound up into rolls, may also be reduced by the addition of the above-described polyethers, relative to the straight EVA composition. Depending on the fraction of the added polyether, the bond strength reducing effect may be regulated steplessly.

The adhesive composition may be processed either from solution or from the melt, i.e., as a hot-melt, or by coextrusion. From 10 to 30 g/m² is an advantageous application rate. It ensures a sufficient cushion of composition for said composition to flow out flush with the surface, without there being any notable residues of composition.

For the very high optical requirements imposed on a protective film for windows, or glass generally, fields of use for which the surface protection film of the invention is particularly suitable, it is absolutely necessary, directly after coating, to roll up the film in its final form without folds or bubbles. Subsequent rewinding is highly deleterious to the optical properties, since folds and bubbles impress themselves irreversibly into the film of adhesive composition. Even intermediate release media such as siliconized paper are unsuitable, since the always slightly rough structure is impressed into the cushion of adhesive composition and causes the product to become matt.

The surface protection film of the invention for automobile glass windows in particular is described below in a preferred embodiment on the basis of a number of examples of surface protection films, without wishing thereby to restrict the invention in any way whatsoever. Also given are two comparative examples featuring unsuitable surface protection films.

EXAMPLES

Example 1

On a cast film unit, 99.3 parts by weight of Daplen KFC 2008 (PCD) and 0.7 parts by weight of the HALS stabilizer Tinuvin 770 in a thickness of 45 μm were coextruded together with a primer of polyethylene-vinyl acetate having a VA fraction of 26% by weight in a thickness of 10 μm on a chill roll at 15° C. The film had an outstanding transparency, surface smoothness, and uniformity.

This film was coated with a toluene solution of polyethylene-vinyl acetate having a VA fraction of 60% by weight so that drying gave an adhesive film having a total thickness of 60 μm. Directly after coating, the film was wound up into rolls 100 m in length, without folds or bubbles, using a contact roller.

The adhesion properties are set out below:

| Parameter* | Measured value, N/cm |
|---|---|
| Bond strength on steel | 1.2 |
| Bond strength on glass after 30 min | 0.3 |
| Bond strength on glass after 3 d at RT | 0.7 |
| Bond strength on glass after 3 d at 90° C. | 2.1 |
| Peel force from the reverse after 1 m at 40° C. | 0.9 |

*at 300 mm/min, angle 180° (peel force 90°), 23° C. ± 1° C., 50% ± 5% relative humidity.

The film was unwindable from the roll with moderate effort, but without any notable stretching, and smoothly, i.e., without crease marks and was stuck without folds to a windshield of the Volkswagen Golf IV, as an example of a curved glass surface. The adhesive composition wetted the glass in such a way that only a few air bubbles disrupting the view through the glass were included. These air bubbles had reduced still further after 24 hours. The overall visual impression of the overstuck window was highly satisfactory. Following storage of the windshield at 90° C. for 3 days, the firmly adhering film was removable without residues of adhesive composition and without tearing.

Samples bonded to window glass were subjected to UV aging (600 h in accordance with DIN 53387 1-A-X). The film was removable flawlessly from the test pane and its clouding was increased only minimally compared with a virgin sample.

Example 2

A film as described in Example 1 was coated with a toluene solution of 95 parts by weight of polyethylene-vinyl acetate having a VA fraction of 50% by weight and 5 parts by weight of the polyether Arcol Polyol 1042 (Arco, Ghent, Belgium) so that drying gave an adhesive film having a total thickness of 60 μm. Directly after coating, the film was wound up into rolls 100 m in length, without folds or bubbles, using a contact roller.

The adhesion properties are set out below:

| Parameter* | Measured value, N/cm |
|---|---|
| Bond strength on steel | 0.3 |
| Bond strength on glass after 30 min | 0.3 |
| Bond strength on glass after 3 d at RT | 0.8 |
| Bond strength on glass after 3 d at 90° C. | 1.6 |
| Peel force from the reverse after 1 m at 40° C. | 0.7 |

*at 300 mm/min, angle 180° (peel force 90°), 23° C. ± 1° C., 50% ± 5% relative humidity.

The film was unwindable from the roll without great effort, but without any notable stretching, and smoothly, i.e., without crease marks and was stuck without folds to a windshield of the Volkswagen Golf IV, as an example of a curved glass surface. The adhesive composition wetted the glass in such a way that only a very few air bubbles disrupting the view through the glass were included. These air bubbles had disappeared almost completely after 24 hours. The overall visual impression of the overstuck window was highly satisfactory. Following storage of the windshield at 90° C. for 3 days, the film was removable with no great effort, without residues and without tearing the film.

Samples bonded to window glass were subjected to UV aging (600 h in accordance with DIN 53387 1-A-X). The film was removable flawlessly from the test pane and its clouding was increased only minimally compared with a virgin sample.

Example 3

A film as described in Example 1 was coated with a toluene solution of 90 parts by weight of polyethylene-vinyl acetate having a VA fraction of 50% by weight and 10 parts by weight of the polyether PolyTHF 2900 (BASF) so that drying gave an adhesive film having a total thickness of 60 μm. Directly after coating, the film was wound up into rolls 100 m in length, without folds or bubbles, using a contact roller.

The adhesion properties are set out below:

| Parameter* | Measured value, N/cm |
|---|---|
| Bond strength on steel | 0.2 |
| Bond strength on glass after 30 min | 0.3 |
| Bond strength on glass after 3 d at RT | 0.7 |
| Bond strength on glass after 3 d at 90° C. | 1.4 |
| Peel force from the reverse after 1 m at 40° C. | 0.7 |

*at 300 mm/min, angle 180° (peel force 90°), 23° C. ± 1° C., 50% ± 5% relative humidity.

The film was unwindable from the roll without great effort, but without any notable stretching, and smoothly, i.e., without crease marks and was stuck without folds to a windshield of the Volkswagen Golf IV, as an example of a curved glass surface. The adhesive composition wetted the glass in such a way that only a very few air bubbles disrupting the view through the glass were included. These air bubbles had undergone almost complete devolatilization after 24 hours. The overall visual impression of the overstuck window was highly satisfactory. Following storage of the windshield at 90° C. for 3 days, the film was removable with no great effort, without residues and without tearing of the film.

Samples bonded to window glass were subjected to UV aging (600 h in accordance with DIN 53387 1-A-X). The film was removable flawlessly from the test pane and its clouding was increased only minimally compared with a virgin sample.

Comparative Example 4

A film was produced as described in Example 1 but without light stabilizers. This film was coated and rolled up as in Example 3. The adhesion and processing properties of the film were identical to those in Example 3. Samples bonded to window glass were subjected to UV aging (600 h in accordance with DIN 53387 1-A-X). The film came apart completely in a manner resembling splinters, became completely opaque, and could no longer be removed from the substrate.

Comparative Example 5

On a cast film unit, 99.3 parts by weight of Daplen KFC 2008 (PCD) and 0.7 parts by weight of the HALS stabilizer Tinuvin 770 in a thickness of 45 μm were extruded on a chill roll at 15° C. The film was corona-treated before being wound up. The film had an outstanding transparency, surface smoothness, and uniformity.

The corona-pretreated side of the film was coated with a solution of an acrylate polymer prepared from 48.5% by weight n-butyl acrylate, 48.5% by weight 2-ethylhexyl acrylate and 3% acrylic acid, to which 0.5% by weight aluminum acetylacetonate was added as crosslinking reagent, so that drying gave an adhesive film having a total thickness of 60 μm. Directly after coating, the film was wound up into rolls 100 m in length, without folds or bubbles, using a contact roller.

The adhesion properties are set out below:

| Parameter* | Measured value, N/cm |
|---|---|
| Bond strength on steel | 1.5 |
| Bond strength on glass after 30 min | 1.0 |
| Bond strength on glass after 3 d at RT | 1.2 |
| Bond strength on glass after 3 d at 90° C. | 1.4 |
| Peel force from the reverse after 1 m at 40° C. | 0.4 |

*at 300 mm/min, angle 180° (peel force 90°), 23° C. ± 1° C., 50% ± 5% relative humidity.

The film was unwindable from the roll very easily and without stretching, but with a clattering noise. Crease marks were distinctly evident on the film, and remained visible even when the film was bonded to a windshield of the Volkswagen Golf IV. A very deleterious effect noted right from the start was the high bond strength, which made it impossible to reposition the film during the application process, since when this film was removed again it underwent irreversible stretching. At these points, the film could no longer be applied without folds. The overall visual impression of the overstuck windshield was therefore unsatisfactory.

Samples bonded to window glass were subjected to UV aging (600 h in accordance with DIN 53387 1-A-X). The film was removable flawlessly from the test pane and its clouding was increased only minimally compared with a virgin sample.

What is claimed is:

1. A surface protection film comprising a transparent backing of polypropylene or propylene-ethylene copolymer, which comprises a light stabilizer, and a self-adhesive composition of polyethylene-vinyl acetate (EVA) having a VA fraction of from 40 to 80% by weight and a melt index MFI in accordance with ISO 1133 (A/4) of from 0.5 to 25 g/10 min at 190° C. and 2.16 kg, which is blended with from 0 to 35% by weight of a polyether of the form

or

having a weight-average molecular weight $M_w$ of from 200 to 100,000 g/mol, X and Y being selected from the group consisting of H—, $(C_nH_{2n+1})$ where n is from 1 to 20, $CH_2{=}CHCO{-}$, $CH_3CH(NH_2)CH_2{-}$, 2,3-epoxypropyl-, $C_6H_5{-}CO{-}$ and $CH_2{=}C(CH_3){-}CO{-}$.

2. The surface protection film as claimed in claim 1, wherein the backing is an unoriented film of from 30 to 120 μm, in thickness, comprising a random propylene-ethylene copolymer having an ethylene fraction of from 2 to 10% by weight, and containing more than 0.3% by weight of a light stabilizer.

3. The surface protection film according to claim 1, wherein the self-adhesive composition comprises polyethylene-vinyl acetate having a VA fraction of from 40 to 80% by weight, and an addition of (1) or (2) of from 0 to 35% by weight, applied at a rate of from 8 to 50 g/m².

4. The surface protection film according to claim 1, wherein between the self-adhesive composition and the film there is a primer comprising EVA having a VA fraction of from 20 to 50% by weight, at a thickness of from 5 to 20 μm, which is coextruded with the backing layer.

5. The surface protection film according to claim 1, wherein light stabilizers in an amount of at least 0.15% by weight based on the backing been added to the backing.

6. A method of protecting the surfaces of windows of motor vehicles which comprises applying the surface protection film of claim 1 to said surfaces.

* * * * *